US012632439B2

(12) United States Patent
Sreedharan et al.

(10) Patent No.: US 12,632,439 B2
(45) Date of Patent: May 19, 2026

(54) DIFFERENCE-SPECIFIC DATABASE UPDATE

(71) Applicant: Capital One Services, LLC, McLean, VA (US)

(72) Inventors: Narendran Sreedharan, McKinney, TX (US); Arvind Sodhi, Plain City, OH (US); Jayakrishna Venkatesh, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/774,206

(22) Filed: Jul. 16, 2024

(65) Prior Publication Data

US 2026/0023735 A1 Jan. 22, 2026

(51) Int. Cl.
*G06F 7/00* (2006.01)
*G06F 16/23* (2019.01)
*G06F 17/00* (2019.01)

(52) U.S. Cl.
CPC ................................ *G06F 16/2365* (2019.01)

(58) Field of Classification Search
None
See application file for complete search history.

(56) References Cited

U.S. PATENT DOCUMENTS

| | | | | |
|---|---|---|---|---|
| 9,866,561 | B2 * | 1/2018 | Psenka | H04L 63/10 |
| 11,507,452 | B1 * | 11/2022 | Yoon | G06F 15/8046 |
| 2021/0374119 | A1 * | 12/2021 | Kato | G06F 16/235 |
| 2023/0099916 | A1 * | 3/2023 | Teyer | G06F 11/0754 |
| | | | | 714/3 |
| 2024/0020419 | A1 * | 1/2024 | Haddon | G06N 3/063 |

OTHER PUBLICATIONS

Marktanner, "Declarative Data Fetching with GraphQL", Oct. 13, 2016, Downloaded May 22, 2024 from https://css-tricks.com/declarative-data-fetching-graphql/; 10 pages.

* cited by examiner

*Primary Examiner* — Tuan A Pham

(74) *Attorney, Agent, or Firm* — Harrity & Harrity, LLP

(57) ABSTRACT

In some implementations, a data storage system may receive target data associated with a first set of rows and a first set of columns. The data storage system may receive historical data associated with a second set of rows and a second set of columns. The data storage system may identify a set of differences between the target data and the historical data. The data storage system may perform, based on the set of differences between the target data and the historical data, a difference-specific update to a target database storing the historical data.

20 Claims, 5 Drawing Sheets

500

510 — Receive target data associated with a first set of rows and a first set of columns 520 — Receive historical data associated with a second set of rows and a second set of columns 530 — Identify a set of differences between the target data and the historical data 540 — Perform, based on the set of differences between the target data and the historical data, a difference-specific update to a target database storing the historical data

400

Bus
410

Processor
420

Memory
430

Input
Component
440

Output
Component
450

Communication
Component
460

DIFFERENCE-SPECIFIC DATABASE UPDATE

BACKGROUND

A database is a set of organized data that can be accessed by a user or external system. For example, the user or external system may access the data stored in the database using an application programming interface (API). In some cases, a database arranges data in one or more rows and columns.

SUMMARY

Some implementations described herein relate to a system for data storage. The system may include one or more memories and one or more processors communicatively coupled to the one or more memories. The one or more processors may be configured to receive target data associated with a first set of rows and a first set of columns. The one or more processors may be configured to receive historical data associated with a second set of rows and a second set of columns. The one or more processors may be configured to generate a first set of checksums based on the first set of rows. The one or more processors may be configured to generate a second set of checksums based on the second set of rows. The one or more processors may be configured to identify a set of differences between the first set of checksums and the second set of checksums. The one or more processors may be configured to perform, based on the set of differences between the first set of checksums and the second set of checksums, a difference-specific update to a target database storing the historical data.

Some implementations described herein relate to a method for data storage. The method may include receiving target data associated with a first set of rows and a first set of columns. The method may include receiving historical data associated with a second set of rows and a second set of columns. The method may include identifying a set of differences between the target data and the historical data. The method may include performing, based on the set of differences between the target data and the historical data, a difference-specific update to a target database storing the historical data.

Some implementations described herein relate to a non-transitory computer-readable medium that stores a set of instructions. The set of instructions may include one or more instructions that, when executed by one or more processors of a data storage system, cause the data storage system to receive target data associated with a first set of rows and a first set of columns. The set of instructions may include one or more instructions that, when executed by one or more processors of the data storage system, cause the data storage system to receive historical data associated with a second set of rows and a second set of columns. The set of instructions may include one or more instructions that, when executed by one or more processors of the data storage system, cause the data storage system to identify a set of differences between the target data and the historical data. The set of instructions may include one or more instructions that, when executed by one or more processors of the data storage system, cause the data storage system to perform, based on the set of differences between the target data and the historical data, a difference-specific update to a target database storing the historical data. The set of instructions may include one or more instructions that, when executed by one or more processors of the data storage system, cause the data storage system to retrieve one or more user-specified columns of the first set of columns in accordance with an access policy.

DETAILED DESCRIPTION

The following detailed description of example implementations refers to the accompanying drawings. The same reference numbers in different drawings may identify the same or similar elements.

Data that is stored in a database is often updated. In some cases, the data can be updated by erasing a current (e.g., entire) set of data from the database and then storing, in the database, an updated (e.g., entire) set of data. However, updating the data in this manner can involve inputting or outputting a large amount of data to or from the database, particularly at scale. An amount of data that is input to or output from a database may be referred to as a "data input/output (I/O)." The high data I/O involved in updating the data in this manner may require excessive processing resources.

Some implementations described herein enable updating data stored in a database based on a difference (or "delta") between a current set of data and an updated set of data. For example, a data storage system may update only the data, within the current set of data, that has been updated. The data storage system may thereby avoid updating the data, within the current set of data, that has not been updated. For example, if only data stored in ten million rows of a database with a total of one hundred million rows has been updated, then the data storage system may rewrite only the data stored in the ten million rows rather than the data stored in all one hundred million rows.

As a result, updating the data in a database based on the difference between the current set of data and the updated set of data may help to reduce data I/O. For example, rather than rewriting the entire current set of data, the data storage system may update a subset of the current set of data using fewer rewrites and, thus, lower data I/O. Therefore, the data storage system may use fewer processing resources to perform an equivalent update to the database.

Figure 1:
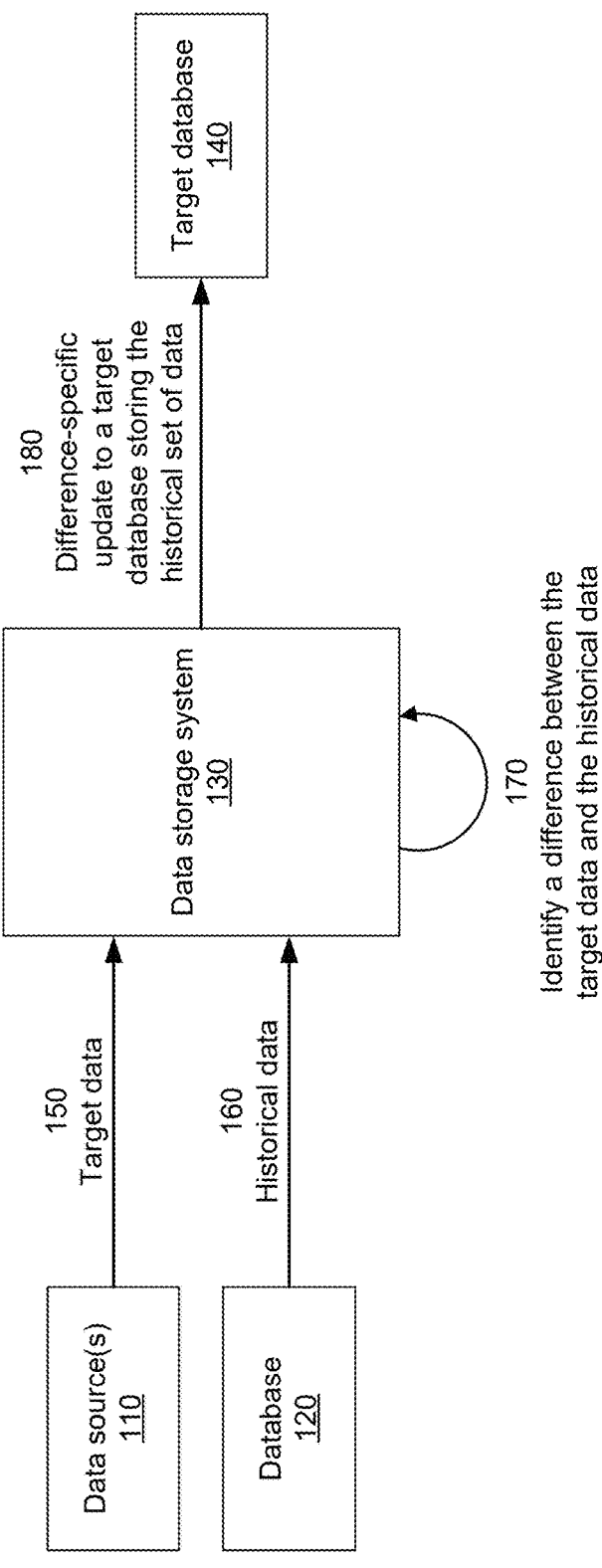
FIG. 1 is a diagram of an example associated with a difference-specific database update, in accordance with some embodiments of the present disclosure.

FIG. 1 is a diagram of an example 100 associated with a difference-specific database update. As shown in FIG. 1, example 100 includes one or more data sources 110, a database 120, a data storage system 130, and a target database 140. The data source(s) 110 may include any suitable sources that produce or store data that is to be stored in the target database 140. The database 120 may store historical data on behalf of the target database 140. For example, the database 120 may store a copy of the data that is stored in the target database 140. The data storage system 130 may comprise a set (e.g., "cluster") of nodes, such as nodes hosted on virtual machines. The target database 140 may store data modeled as a set of rows and a set of columns. Although FIG. 1 shows a single database 120 and a single target database 140, other examples may include multiple databases that store historical data and/or multiple target databases. These entities are described in more detail in connection with FIGS. 3 and 4.

As shown by reference number 150, in some aspects, the data storage system 130 may receive, from the data source(s) 110, target data associated with a first set of rows and a first set of columns. The first set of rows and the first set of columns may be rows and columns of the target database 140. For example, the target data may be associated with the first set of rows and the first set of columns in that the data storage system 130 may determine that the target data is to be stored in the first set of rows and the first set of columns. The target data may comprise a current load. In some examples, the target data may include information (e.g., names, addresses, profiles, activity, authentication identifiers, or the like) collected from various data sources 110. For example, the rows of the target database 140 may correspond to respective people, and the columns of the target database 140 may correspond to respective attributes of the information. In some examples, the data storage system 130 may consolidate the information by determining that information collected from different data sources 110 and corresponding to a given person is to be stored in the row corresponding to the given person.

As shown by reference number 160, in some aspects, the data storage system may receive historical data associated with a second set of rows and a second set of columns. The second set of rows and the second set of columns may be rows and columns of the target database 140. The second set of rows may include zero or more rows that are included in the first set of rows, and the second set of columns may include zero or more columns that are included in the first set of columns. In some examples, the historical data may be a copy of a current set of data that is stored in the target database 140. For example, the historical data may comprise a previous load. The historical data may be associated with the second set of rows and the second set of columns in that the data storage system 130 may determine that the historical data is to be stored in the second set of rows and the second set of columns.

In some aspects, the data storage system 130 may receive the historical data from one or more databases that are different than the target database. For example, the data storage system 130 may receive the historical data from the database 120. In some examples, the data storage system 130 may store the historical data in a container (e.g., a "bucket") configured to store one or more objects.

As shown by reference number 170, in some aspects, the data storage system 130 may identify a set of differences between the target data and the historical data. For example, the data storage system 130 may compare the historical data (which may be stored in the container) with the target data to identify any changes from the historical data to the target data. The set of differences may comprise one or more differences between target data corresponding to a given row and column and historical data corresponding to the same row and column. The presence of a difference between the target data and the historical data may indicate that the target database 140 is to be updated.

In some aspects, the data storage system 130 may compare a first set of checksums generated based on the first set of rows with a second set of checksums generated based on the second set of rows. For example, in some aspects, the data storage system 130 may generate the first set of checksums and the second set of checksums and identify a set of differences between the first set of checksums and the second set of checksums. For example, with reference to Table 1 below, the data storage system 130 may generate a first checksum of the historical data, such as MD5(A001, Smith,Plain City,Ohio,43064), and a second checksum of the target data, such as MD5(A001,Smith,Columbus,Ohio, 43220), and determine that the first checksum and the second checksum are different.

TABLE 1

| | Key | Attribute 1 | Attribute 2 | Attribute 3 | Attribute 4 |
|---|---|---|---|---|---|
| Historical data | A001 | Smith | Plain City | Ohio | 43064 |
| Target data | A001 | Smith | Columbus | Ohio | 43220 |

In some aspects, identifying the set of differences between the target data and the historical data (e.g., identifying the set of differences between the first set of checksums and the second set of checksums) may comprise identifying a set of differences between the first set of rows and the second set of rows. For example, the data storage system 130 may identify the row(s) containing data that has changed. For example, with reference to Table 1, based on the first and second checksums being different, the data storage system 130 may identify that the row corresponding to "A001" contains data that has changed.

In some aspects, identifying the set of differences between the target data and the historical data (e.g., identifying the set of differences between the first set of checksums and the second set of checksums) may comprise identifying a set of differences between the first set of columns and the second set of columns. For example, in some aspects, the data storage system 130 may identify the set of differences between the first set of columns and the second set of columns responsive to comparing the first set of checksums and the second set of checksums. For example, after identifying the row(s) containing data that has changed, the data storage system 130 may further identify one or more columns containing updated and/or added data relative to the historical data. For example, with reference to Table 1, the data storage system 130 may compare each attribute in the row corresponding to "A001" to identify the columns that contain the updated data in the row.

In some aspects, the data storage system 130 may identify the set of differences between the target data and the historical data responsive to receiving a dynamic payload associated with the target data. For example, in some aspects, the data storage system 130 may identify the set of differences between the first set of checksums and the second set of checksums responsive to receiving the dynamic payload. The dynamic payload may be associated with the target data in that the dynamic payload may comprise the target data. In some examples, the data storage system 130 may receive a notification of the target data, create the dynamic payload based on the content of the notification, and forward the dynamic payload internally. For example, the data storage system 130 may create a JavaScript object notation (JSON) payload indicating which rows and/or columns have changed.

As shown by reference number 180, in some aspects, the data storage system 130 may perform, based on the set of differences between the target data and the historical data, a difference-specific update to a target database storing the historical data. The difference-specific update may be an update to the target database 140 that is specific to a change in the data. For example, the data storage system 130 may update only the rows and/or attributes in the target database 140 containing data that has changed. The data storage system 130 may perform the difference-specific update using streaming (e.g., continuously in real-time) and/or using batch processing (e.g., at select times). In some examples, the data storage system 130 may include a listener (e.g., a common rule-based stream listener, a serverless message listener comprising a scheduler component, or the like) that routes input messages to a corresponding target storage location of the target database 140. In some examples, the input messages may comprise notifications of the target data. For example, the dynamic payload (e.g., the JSON payload) may be ingested into the target database 140. For example, the dynamic payload may invoke a data pipeline corresponding to the target storage location and thereby cause the data that has changed to be ingested into the target database 140.

In some aspects, the data storage system 130 may store the target data in the one or more databases that are different than the target database. For example, the data storage system 130 may store the target data (e.g., the data that has changed) in the database 120. Thus, the database 120 may maintain a copy of the data ingested by and stored in the target database 140. For example, the data storage system 130 may merge the target data with the historical data (e.g., a copy of the data stored in the target database 140) for a subsequent iteration of ingestion of further target data. The one or more databases may be different than the target database 140 in that the one or more databases are located in different physical and/or virtual locations.

As indicated above, FIG. 1 is provided as an example. Other examples may differ from what is described with regard to FIG. 1.

Figure 2:
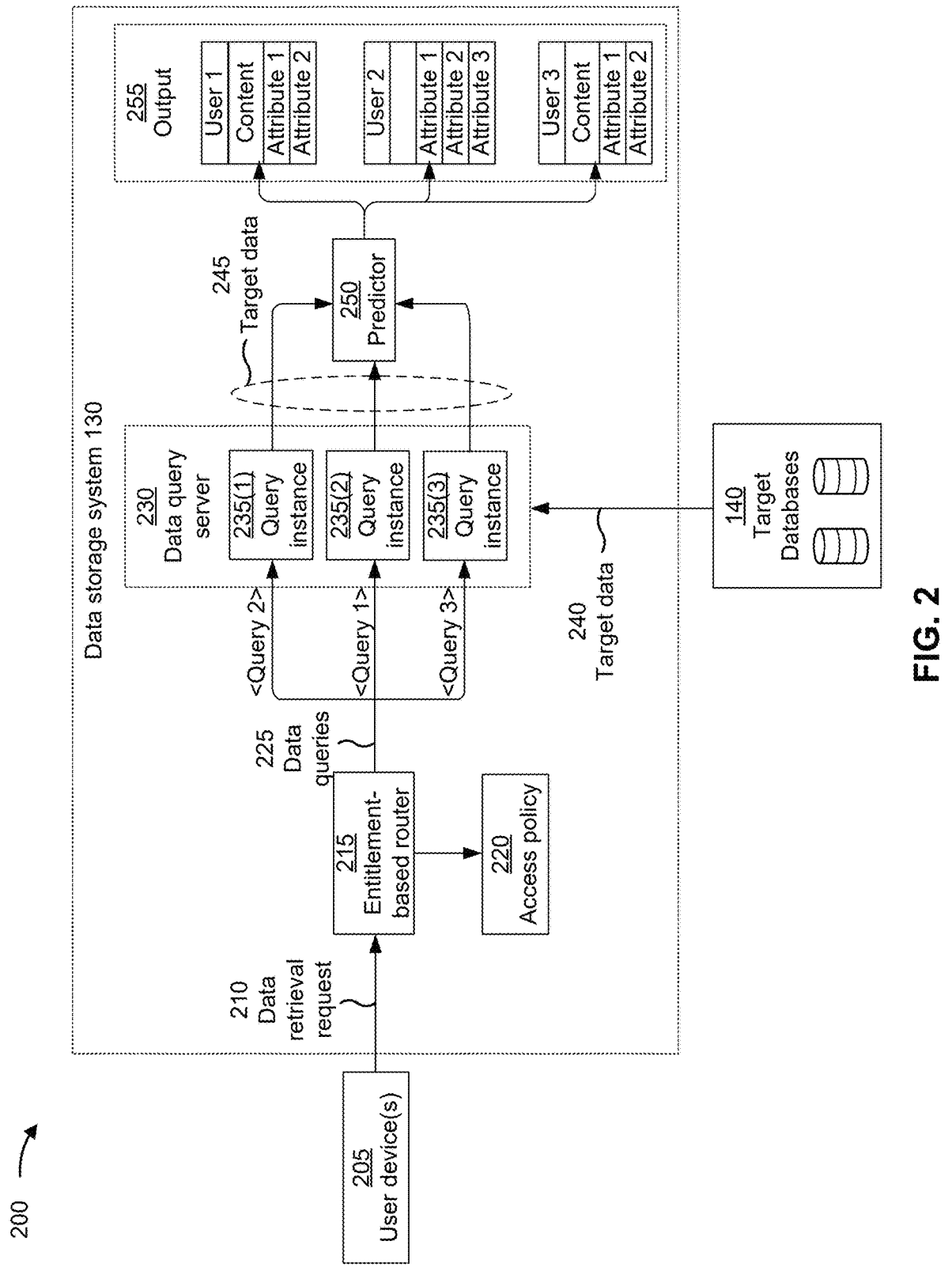
FIG. 2 is a diagram of an example associated with data retrieval, in accordance with some embodiments of the present disclosure.

FIG. 2 is a diagram of an example 200 associated with data retrieval. As shown in FIG. 2, example 200 includes one or more user devices 205 (e.g., desktops, mobile devices, or the like), the data storage system 130, and one or more target databases 140.

As shown by reference number 210, the data storage system 130 may receive, from the user device(s) 205, a request to retrieve at least a portion of the target data from the target database(s) 140. For example, an entitlement-based router 215 of the data storage system 130 may receive the request. The entitlement-based router 215 may be a logical router configured to route data retrieval requests based on an access policy 220.

In some aspects, the data storage system 130 may retrieve at least the portion of the target data in accordance with an access policy 220. For example, as shown by reference number 225, the entitlement-based router 215 may identify, using the access policy 220, a user that originated the request to retrieve at least the portion of the target data. The access policy 220 may govern access control. For example, the access policy 220 may control which data stored in the target database(s) 140 is accessible by various users, including the user. For example, the access policy 220 may control which columns (e.g., attributes) the user may access. The access policy 220 may comprise an access role, a policy configuration, a role policy definition, an identity mapping logic, or the like. The access policy 220 may segregate data retrieval by providing role-based access control. For example, the access policy 220 may enable users associated with a first role to access a first set of attributes and users associated with a second role to access a second set of attributes. In some examples, the access policy 220 may comprise an entitlement metastore that contains metadata (e.g., parameters, tiers, or the like) pertaining to one or more downstream consumption applications. The data storage system 130 may dynamically update a change to the metadata (e.g., with zero downtime). Thus, the data storage system 130 may dynamically maintain user access control using the entitlement metastore.

As shown by reference number 225, the entitlement-based router 215 may dynamically generate (e.g., render) one or more data queries based on the access policy 220 (e.g., based on the user access control indicated by the entitlement metastore). In some examples, one or more data queries may contain only those rows and/or columns that are accessible by the user originating the corresponding data retrieval request. Thus, for example, the access policy 220 may segregate access control and establish both row-level and column-level security. In example 200, the data queries may comprise payloads shown as "Query 1," "Query 2," and "Query 3." In some examples, the entitlement-based router 215 may render the data queries using an intermediary application programming interface (API). The intermediary API may be a representational state transfer (REST) API.

In some examples, the entitlement-based router 215 may route the data queries to a data query server 230. For example, the data query server 230 may include a plurality of query instances 235(1)-235(3) that receive respective data queries. The entitlement-based router 215 may route the data queries to query instances 235(1)-235(3) based on the access policy 220. The query instances 235(1)-235(3) may comprise data access endpoints configured to retrieve data from the target databases 140. For example, the query instances 235(1)-235(3) may segregate data access at the table level. The query instances 235(1)-235(3) may cater to a variety of use cases.

As shown by reference number 240, the data query server 230 (e.g., the query instances 235(1)-235(3)) may retrieve at least a portion of the target data from the target databases 140. In some examples, the data query server 230 may retrieve data from the target databases 140 using a data query API that facilitates communication between the data query server 230 and the target databases 140. In some examples, the data query server 230 may, using the data query API, submit a single API request to retrieve data from the target databases 140, regardless of whether the data is stored in a single target database 140 or multiple target databases 140. In examples involving multiple target databases 140, the data query server 230 may stitch the data received from multiple target databases 140 dynamically (e.g., on-the-fly).

In some aspects, the data storage system 130 may retrieve one or more user-specified columns of the first set of columns. For example, in cases where declarative data fetching is enabled, the entitlement-based router 215 may generate the data queries based on the attributes that are identified (e.g., selected, requested, or the like) in the data retrieval request(s). In some examples, the data query server 230 may retrieve, from the target databases 140, only those attributes (e.g., parameters, elements, or the like), rather than retrieving attributes for the entire row. For example, the target databases 140 may return selective elements. Thus, the data storage system 130 may restrict data retrieval to one or more requested parameter(s). In some aspects, the data storage system 130 may retrieve the one or more user-specified columns in accordance with the access policy 220. For example, the data query server 230 may retrieve only attributes that are indicated in a data retrieval request and that are accessible by the requesting user based on the access policy 220.

As shown by reference number 245, the data query server 230 (e.g., the query instances 235(1)-235(3)) may provide the target data to a predictor 250 in a predictive service layer of the data storage system 130. The predictor 250 may, in turn, generate outputs 255 for respective users in accordance with the access policy 220. For example, Table 2 below illustrates an example in which the target databases 140 contain data collected from disparate sources (e.g., sources 1-3), and the access policy 220 permits a given user to access attributes 1, 2, and 4, and not attribute 3. As shown, the data associated with attribute 3 may be masked and, thus, not viewable to the user.

TABLE 2

| Attribute 1 (source 1) | Attribute 2 (source 2) | Attribute 3 (source 3) | Attribute 4 (source 3) |
|---|---|---|---|
| Data | Data | [masked] | Data |

As indicated above, FIG. 2 is provided as an example. Other examples may differ from what is described with regard to FIG. 2.

Performing the difference-specific update to the target database 140 may help to reduce data I/O with respect to the target database 140. For example, rather than rewriting an entire set of data stored in the target database 140, the data storage system 130 may update a subset of the data using fewer rewrites, lower data I/O, and fewer processing resources than would be implicated without the difference-specific update.

Retrieving at least a portion of the target data in accordance with the access policy 220 may help to improve security of data stored in the target database(s) 140. For example, instead of providing users with direct access to the target database(s) 140 for consumption purposes and permitting the users to access all data stored in the target database(s) 140, the data storage system 130 may control data access based on the access policy 220. For example, the access policy 220 may, using dynamic entitlement-driven access control, help to seamlessly enforce row-level and/or column-level security by ensuring segregated access patterns at the row level and/or the column level. In some examples, the data storage system 130 may seamlessly generate rule-based and/or model-driven insights using the segregated access patterns, which may be leveraged across applications.

Retrieving one or more user-specified columns of the first set of columns may help to reduce bandwidth and/or other resources used to retrieve target data, and/or may help to further reduce data I/O with respect to retrieving data from the target database 140. For example, the data storage system 130 may retrieve only the attributes that were requested by a user.

Figure 3:
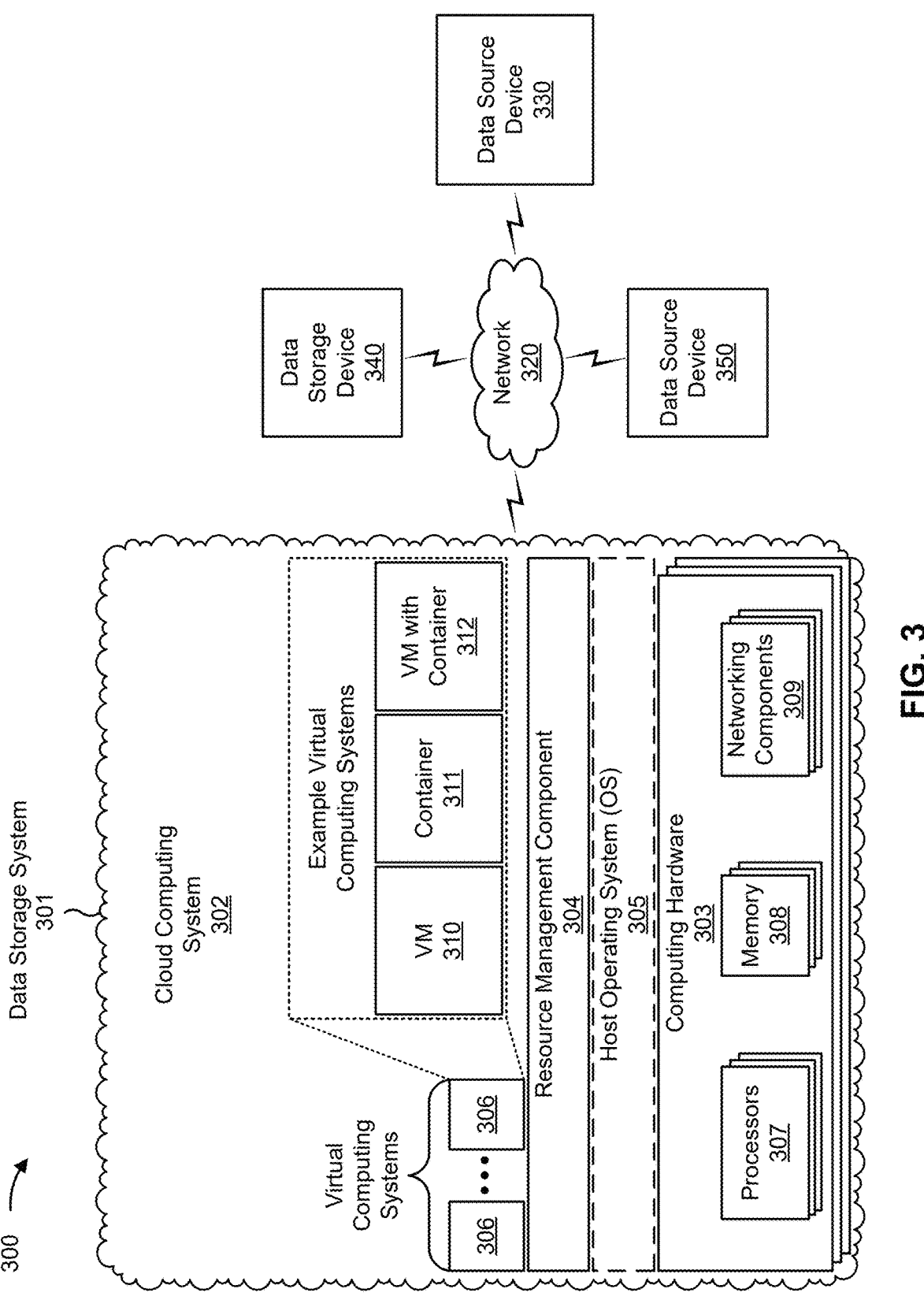
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a data storage system 301, which may include one or more elements of and/or may execute within a cloud computing system 302. The cloud computing system 302 may include one or more elements 303-312, as described in more detail below. As further shown in FIG. 3, environment 300 may include a network 320, a data source device 330, and data storage devices 340 and 350. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the data storage system 301 may include one or more elements 303-312 of the cloud computing system 302, may execute within the cloud computing system 302, and/or may be hosted within the cloud computing system 302, in some implementations, the data storage system 301 may not be cloud-based (e.g., may be implemented outside of a cloud computing system) or may be partially cloud-based. For example, the data storage system 301 may include one or more devices that are not part of the cloud computing system 302, such as device 400 of FIG. 4, which may include a standalone server or another type of computing device. The data storage system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data source device 330 may include any suitable device configured to transmit data to the data storage system 301. The data source device 330 may comprise a user device (e.g., a phone, a laptop, a tablet, a wearable device, or the like), a server, a computing and/or storage system external to the data storage system (e.g., a cloud computing system), or the like.

The data storage devices 340 and 350 may include any suitable device configured to store data in a database. For example, the data storage device 340 may host the database 120, and the data storage device 350 may host the target database 140. The data storage devices 340 and 350 may comprise servers, cloud computing systems, or the like.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
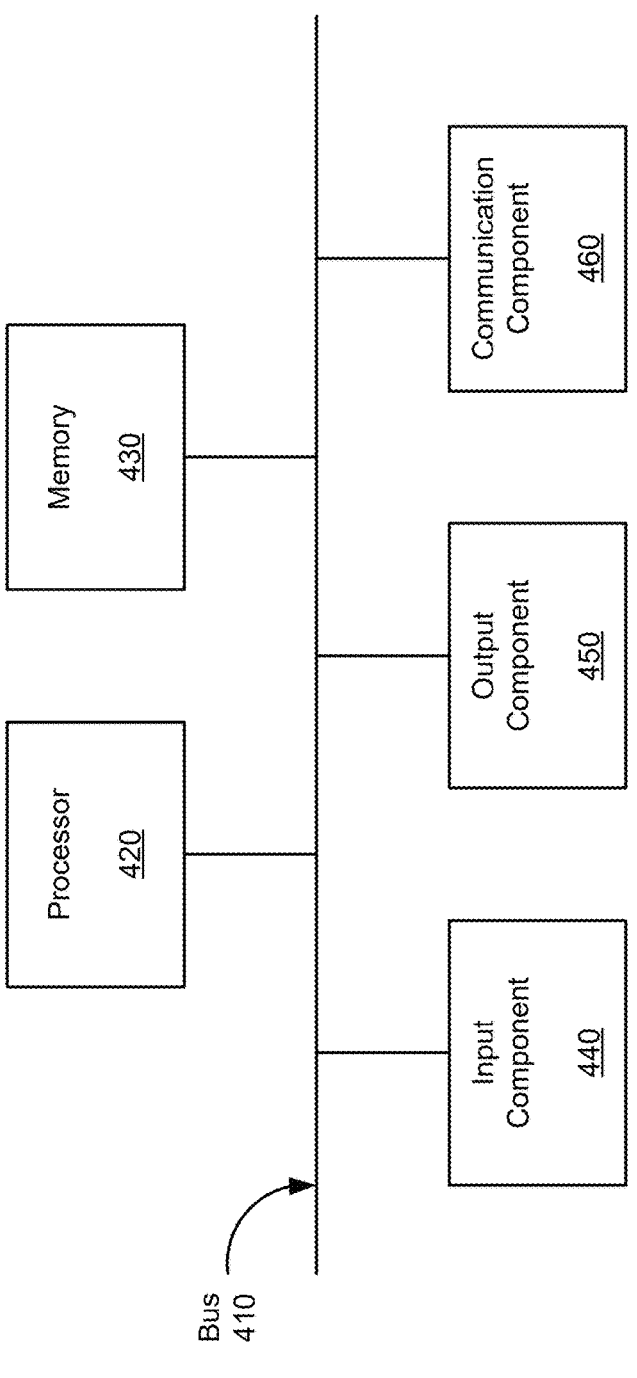
FIG. 4 is a diagram of example components of a device associated with difference-specific database updates, in accordance with some embodiments of the present disclosure.

FIG. 4 is a diagram of example components of a device 400 associated with difference-specific database updates. The device 400 may correspond to the data storage system 301, the data source device 330, the data storage device 340, and/or the data storage device 350. In some implementations, the data source device 330, the data storage device 340, and/or the data storage device 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection).

The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
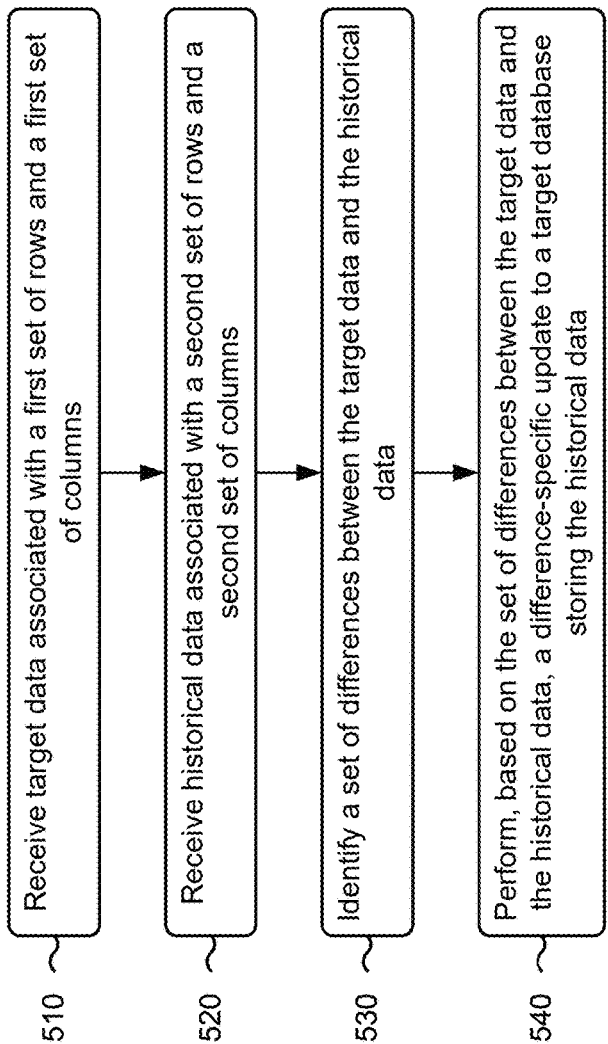
FIG. 5 is a flowchart of an example process associated with difference-specific database updates, in accordance with some embodiments of the present disclosure.

FIG. 5 is a flowchart of an example process 500 associated with difference-specific database updates. In some implementations, one or more process blocks of FIG. 5 may be performed by the data storage system 301. In some implementations, one or more process blocks of FIG. 5 may be performed by another device or a group of devices separate from or including the data storage system 301, such as the data source device 330, the data storage device 340, and/or the data storage device 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving target data associated with a first set of rows and a first set of columns (block 510). For example, the data storage system 301 (e.g., using processor 420, memory 430, input component 440, and/or communication component 460) may receive target data associated with a first set of rows and a first set of columns, as described above in connection with reference number 150 of FIG. 1. As an example, the target data may include target user information, such as user names, user addresses, user profiles, user activity, or the like.

As further shown in FIG. 5, process 500 may include receiving historical data associated with a second set of rows and a second set of columns (block 520). For example, the data storage system 301 (e.g., using processor 420, memory 430, input component 440, and/or communication component 460) may receive historical data associated with a second set of rows and a second set of columns, as described above in connection with reference number 160 of FIG. 1. As an example, the historical data may be a copy of a current version of the user information.

As further shown in FIG. 5, process 500 may include identifying a set of differences between the target data and the historical data (block 530). For example, the data storage system 301 (e.g., using processor 420 and/or memory 430) may identify a set of differences between the target data and the historical data, as described above in connection with reference number 170 of FIG. 1. As an example, the data storage system 301 may compare the current version of the user information with the target user information to identify any changes between the current version of the user information and the target user information.

As further shown in FIG. 5, process 500 may include performing, based on the set of differences between the target data and the historical data, a difference-specific update to a target database storing the historical data (block 540). For example, the data storage system 301 (e.g., using processor 420 and/or memory 430) may perform, based on the set of differences between the target data and the historical data, a difference-specific update to a target database storing the historical data, as described above in connection with reference number 180 of FIG. 1. As an example, the data storage system 301 may update only the target user information that has changed relative to the current version of the user information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1 and/or 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data storage, the system comprising:
one or more memories; and
one or more processors, communicatively coupled to the one or more memories, configured to:
receive, by a data storage system and from one or more data sources associated with target data, target data that is associated with a first set of rows and a first set of columns;
receive, by the data storage system and from one or more databases associated with historical data, historical data that is associated with a second set of rows and a second set of columns;
generate, by the data storage system, a first set of checksums based on the first set of rows;
generate, by the data storage system, a second set of checksums based on the second set of rows;
identify, by the data storage system, a set of differences between the first set of checksums and the second set of checksums;
control data access to a target database based on one or more access policies,
wherein the one or more access policies provide segregated access to portions of data of the target database to improve security;
perform, based on the set of differences between the first set of checksums and the second set of checksums, a difference-specific update to the target database,
wherein performing the difference-specific update comprises:
transmitting first data associated with the difference-specific update that is a lesser data amount compared to second data associated with a full data update to reduce an overall data transmitted; and
stitch, based on receiving a request for data retrieval and based on the one or more access policies, data received from one or more target databases, wherein the one or more target databases include the target database,
wherein the stitched data masks a subset of the data based on the one or more access policies.

2. The system of claim 1, wherein the one or more processors, to identify the set of differences between the first set of checksums and the second set of checksums, are configured to:
identify the set of differences between the first set of checksums and the second set of checksums responsive to receiving a dynamic payload associated with the target data.

3. The system of claim 1, wherein the one or more processors, to identify the set of differences between the first set of checksums and the second set of checksums, are configured to:
identify a set of differences between the first set of rows and the second set of rows.

4. The system of claim 1, wherein the one or more processors, to identify the set of differences between the first set of checksums and the second set of checksums, are configured to:
identify a set of differences between the first set of columns and the second set of columns.

5. The system of claim 1, wherein the one or more processors, to receive the historical data, are configured to:
receive the historical data from one or more databases that are different than the target database.

6. The system of claim 5, wherein the one or more processors are further configured to:
store the target data in the one or more databases.

7. The system of claim 1, wherein the one or more processors are further configured to:
retrieve at least a portion of the target data in accordance with an access policy.

8. The system of claim 1, wherein the one or more processors are further configured to:
retrieve one or more user-specified columns of the first set of columns.

9. The system of claim 1, wherein the one or more access policies comprise an entitlement metastore that contains metadata associated with one or more downstream consumption applications.

10. A method for data storage, comprising:
receiving, by a data storage system and from one or more data sources associated with target data, target data that is associated with a first set of rows and a first set of columns;
receiving, by the data storage system and from one or more databases associated with historical data, the historical data that is associated with a second set of rows and a second set of columns;
identifying, by the data storage system, a set of differences between the target data and the historical data;
controlling data access to a target database based on one or more access policies,
wherein the one or more access policies provide segregated access to portions of data of the target database to improve security;
performing, based on the set of differences between the target data and the historical data, a difference-specific update to the target database,
wherein performing the difference-specific update comprises:
transmitting first data associated with the difference-specific update that is a lesser data amount compared to second data associated with a full data update to reduce data transmitted; and stitching, by the data storage system and based on receiving a request for data retrieval and based on the one or more access policies, data received from one or more target databases, wherein the one or more target databases include the target database, wherein the stitched data masks a subset of the data based on the one or more access policies.

11. The method of claim 10, wherein identifying the set of differences between the target data and the historical data comprises:

identifying the set of differences between the target data and the historical data responsive to receiving a dynamic payload associated with the target data.

12. The method of claim 10, wherein identifying the set of differences between the target data and the historical data comprises:

identifying a set of differences between the first set of rows and the second set of rows.

13. The method of claim 10, wherein identifying the set of differences between the target data and the historical data comprises:

comparing a first set of checksums generated based on the first set of rows with a second set of checksums generated based on the second set of rows.

14. The method of claim 10, wherein identifying the set of differences between the target data and the historical data comprises:

identifying a set of differences between the first set of columns and the second set of columns.

15. The method of claim 10, wherein receiving the historical data comprises:

receiving the historical data from one or more databases that are different than the target database.

16. The method of claim 10, further comprising:

retrieving at least a portion of the target data in accordance with an access policy.

17. The method of claim 10, further comprising:

retrieving one or more user-specified columns of the first set of columns.

18. A non-transitory computer-readable medium storing a set of instructions, the set of instructions comprising:

one or more instructions that, when executed by one or more processors of a data storage system, cause the data storage system to:

receive, by a data storage system and from one or more data sources associated with target data, target data that is associated with a first set of rows and a first set of columns;

receive, by the data storage system and from one or more databases associated with historical data, historical data that is associated with a second set of rows and a second set of columns;

identify, by the data storage system, a set of differences between the target data and the historical data;

control data access to a target database based on one or more access policies, wherein the one or more access policies provide segregated access to portions of data of the target database to improve security;

perform, based on the set of differences between the target data and the historical data, a difference-specific update to a target database storing the historical data, wherein performing the difference-specific update comprises:

transmitting first data associated with the difference-specific update that is a lesser amount of data compared to second data associated with a full data update to reduce an overall data transmitted;

stitch, based on receiving a request for data retrieval and based on the one or more access policies, data received from one or more target databases, wherein the one or more target databases include the target database, wherein the stitched data masks a subset of the data based on the one or more access policies; and retrieve one or more user-specified columns of the first set of columns in accordance with an access policy of the one or more access policies.

19. The non-transitory computer-readable medium of claim 18, wherein the one or more instructions, that cause the data storage system to identify the set of differences between the target data and the historical data, cause the data storage system to:

compare a first set of checksums generated based on the first set of rows with a second set of checksums generated based on the second set of rows.

20. The non-transitory computer-readable medium of claim 19, wherein the one or more instructions, that cause the data storage system to identify the set of differences between the target data and the historical data, cause the data storage system to:

identify, responsive to comparing the first set of checksums and the second set of checksums, a set of differences between the first set of columns and the second set of columns.

* * * * *